March 10, 1936.  L. A. KILLE  2,033,287

SWITCHING DEVICE

Filed June 30, 1934

INVENTOR
L.A. KILLE
BY
ATTORNEY

Patented Mar. 10, 1936

2,033,287

UNITED STATES PATENT OFFICE 2,033,287

SWITCHING DEVICE

Lindley A. Kille, Boonton, N. J., assignor to Bell Telephone Laboratories, Incorporated, New York, N. Y., a corporation of New York Application June 30, 1934, Serial No. 733,191

6 Claims. (Cl. 200—97)

This invention relates to electric switching devices and more particularly to electric relays of the slow-to-operate type, whereby the establishment of a desired circuit condition is delayed for a predetermined interval of time.

The object of this invention is to provide an improved device of this character whose operating time may be varied between wide limits without undue complication of moving parts.

This object is attained in accordance with a feature of the invention by use of a small motor whose rotor is movable longitudinally upon energization of the motor to actuate circuit controlling contacts.

Specifically, this invention contemplates the use of a small split-phase induction motor whose rotor is mounted on a threaded shaft which is arranged to advance through a threaded collar and operate a spring pile-up when the rotor and shaft are rotated.

Figure 1:
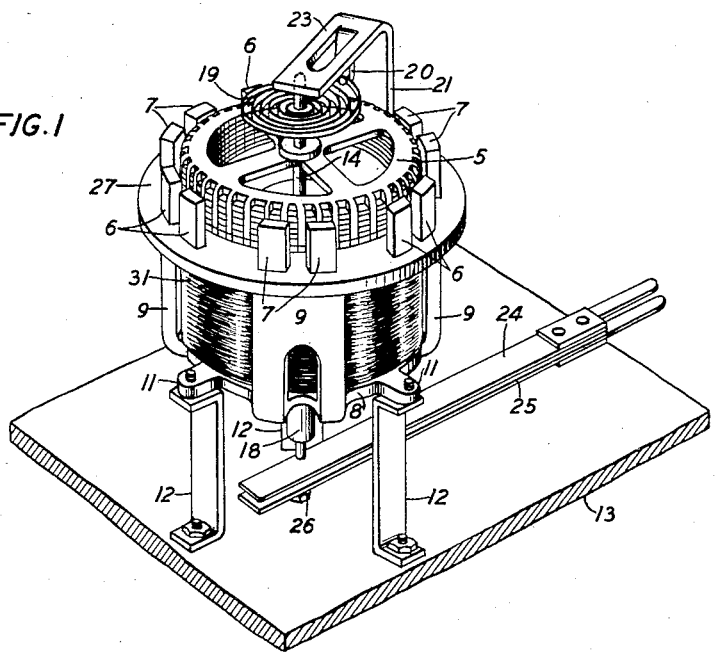
Figure 2:
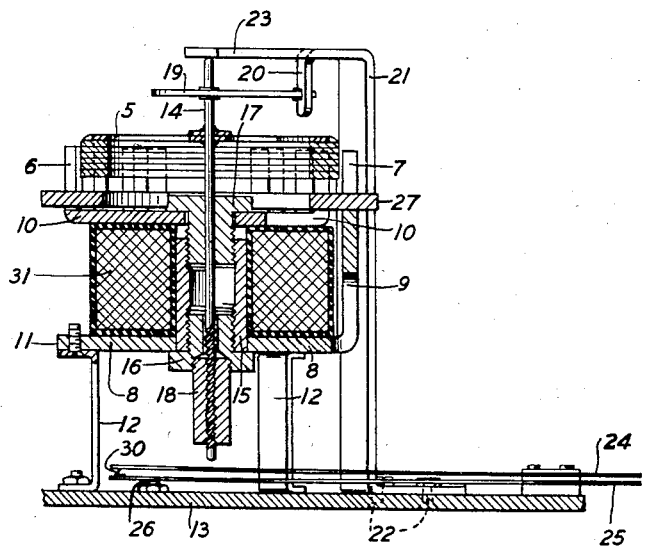

The invention will be readily understood from the following detailed description made with reference to the accompanying drawing, in which Fig. 1 is a perspective view of the relay constituting this invention; and Fig. 2 is an elevation, partly in section, of the relay shown in Fig. 1.

The motor employed in this relay structure may be any well known type and as disclosed, consists essentially of the rotor 5, stator field poles 6 and stator winding 7.

The field poles 7 are formed on a spider-like structure consisting of base portion 8 and three vertically extending integral arms 9 which are bifurcated at their free ends to effect the poles 7. The field poles 6 are formed in a similar manner, constituting bifurcated vertical projections of the base portion 10. The poles 6 and 7 are alternately disposed around the rotor 5, the annular space between the rotor and field poles constituting an air-gap.

The base portion 8 is provided with lateral projections 11 by virtue of which the relay structure is supported on the vertical supports 12 and secured thereto by means of screws, as shown. The supports 12 are secured to a mounting plate 13 by screw bolts.

The rotor 5 is rigidly mounted on shaft 14 in any suitable manner, the lower end of the shaft being threaded as shown in Fig. 2. The base portion 8 is force fitted on one end of a cylindrical member 15 which is internally threaded at each end to accommodate the screw type bushings 16 and 17.

Into the lower end of bushing 16 an element 18 is threaded, the latter being provided with an internal thread for a purpose to be hereinafter set forth.

The upper bushing 17 is screwed into the cylindrical member 15 and is provided with a circular shoulder by means of which the base member 10 is clamped into position on the coil 31.

The elongated shaft 14 has its lower end provided with a thread which cooperates with the internal thread of the element 18 to cause the shaft to move longitudinally whenever it is rotated. At its upper end shaft 14 carries a restoring coil spring 19, one end of which is made fast to a depending lip 20 which is an integral part of the vertical member 21 mounted on the mounting plate 13 by means of screws 22.

The horizontal portion 23 of member 21 serves as a stop for shaft 14 to limit its return movement under the action of spring 19.

Mounted on the mounting plate 13 is a pair of contact springs 24, 25, the free end of spring 24 being so located with respect to the lower end of shaft 14 as to be actuated by the shaft when the latter is moved longitudinally. The free end of spring 25 rests upon the adjustable stop 26.

A short-circuited copper ring 27 is mounted in such a manner as to be in engagement with the poles 6 and 7. The purpose of the copper ring 27 is to render the motor self-starting in accordance with well known principles. It is to be understood that the particular motor structure shown constitutes no part of applicant's invention as any slow speed self-starting motor would serve the desired purpose.

The device operates in the following manner: When the coil 31 is energized from any suitable source of alternating current, the rotor 5 experiences a force of rotation due to the rotating field set up by the stator pole pieces 6, 7. Shaft 14, rigidly secured to rotor 5, accordingly rotates and advances longitudinally due to the screwing of the shaft 14 into the threaded element 18. As a result of this longitudinal movement of shaft 14, its lower end engages spring 24 and forces it into engagement with the spring 25, causing contacts 30 to be closed. Springs 24, 25 may control any external circuit or the operation of a device which is to function some time after the application of current to the winding 31.

The advance of the shaft 14 is arrested when the contacts 30 are closed. This is due to the normal engagement of spring 25 with the stop member 26. The motor is accordingly stalled and the contacts 30 are maintained closed by the stalled torque of the motor. This insures a positive and non-chattering closure of the contacts 30 which endures until the coil 5 is deenergized.

When coil 31 is deenergized by the opening of its operating circuit, the shaft 14 and rotor 5 are rotated in a reverse direction under the influence of restoring spring 19. The shaft 14 accordingly moves upwardly until its upper end impinges against the back stop 23.

The structure just described provides an accurate slow-to-operate relay whose operating time can be varied between wide limits without undue complication of moving parts. By varying the position of the back stops 23 and 26, the position of springs 24, 25, the pitch of the threads of shaft 14 and element 18, the number of poles and the frequency of the applied alternating current, a relay for any reasonable operating time can be obtained. Also for any particular mechanical construction and current frequency, a very wide variation in operating time can be obtained by varying the positions of the back stop and springs alone. Also, the relay of this invention, operating on a rotating field principle is not subject to false operation on direct current or surge currents.

What is claimed is:

1. A slow-operating relay comprising a motor having a rotor mounted on a rotatable shaft, means effective upon the energization of said motor and the consequent rotation of said rotor for advancing said shaft longitudinally, a contact mechanism operated by said shaft in its advanced position and means cooperating with said contact mechanism for stalling said motor when said shaft reaches its advanced position whereupon said contact mechanism is maintained operated by the stalled torque of said motor.

2. A slow-operating relay comprising a motor having a rotor mounted on a rotatable shaft, means effective upon the energization of said motor and the consequent rotation of said rotor for advancing said shaft longitudinally, means for stalling said rotor comprising a stop, effective in arresting the longitudinal movement of said shaft and a contact mechanism interposed between said shaft and said stop.

3. A slow-operating relay comprising a motor having a rotor mounted on a rotatable shaft, means effective upon the energization of said motor and the consequent rotation of said rotor for advancing said shaft longitudinally, a contact mechanism operated by said shaft in its advanced position and means effective upon the deenergization of said motor for causing said shaft to return to its normal position.

4. A slow-operating relay comprising a motor having a rotor mounted on a rotatable shaft, means effective upon the energization of said motor and the consequent rotation of said rotor for advancing said shaft longitudinally, a contact mechanism operated by said shaft in its advanced position, means effective upon the deenergization of said motor for causing said shaft to move longitudinally towards its normal position and means for arresting the return movement of said shaft when it reaches its normal position.

5. A slow-operating relay comprising a motor having a rotor mounted on a rotatable shaft, means for energizing said motor to cause said rotor to rotate in one direction, means for advancing said shaft longitudinally upon the rotation of said rotor, a control mechanism operated by said shaft when in its advanced position and means effective upon the deenergization of said motor for causing said rotor to rotate in a reverse direction whereby said shaft is returned to its normal position.

6. A slow-operating relay comprising a motor having a rotor securely mounted on a rotatable shaft, means for rotating said rotor in two directions, means effective upon the rotation of said rotor in either direction for causing said shaft to move longitudinally in either direction, means for limiting the longitudinal movements of said shaft in either direction and a contact mechanism operated by said shaft when moved longitudinally in a certain direction.

LINDLEY A. KILLE.